March 12, 1963 R. A. KEIR ET AL 3,081,032

PARALLEL DIGITAL ADDER SYSTEM

Filed Feb. 1, 1960 4 Sheets-Sheet 1

INVENTORS
ROY A. KEIR
JESSE T. QUATSE
BY
Byard G. Nilsson

INVENTORS
ROY A. KEIR
JESSE T. QUATSE
BY Byard G. Nilsson

INVENTORS
ROY A. KEIR
JESSE T. QUATSE
BY
Byard G. Nilsson

INVENTORS
ROY A. KEIR
JESSE T. QUATSE
BY Byard G. Nilsson 3,081,032
PARALLEL DIGITAL ADDER SYSTEM Roy A. Keir, Inglewood, and Jesse T. Quatse, Los Angeles, Calif., assignors to The Bendix Corporation, a corporation of Delaware Filed Feb. 1, 1960, Ser. No. 5,859
5 Claims. (Cl. 235—175)

The present invention relates to a digital adder for arithmetically combining numerical values as represented by electrical signals, and is a continuation-in-part of copending application, Serial No. 795,816, entitled Digital Adder System, filed February 26, 1959, now abandoned.

In general, arithmetic operations are performed in computing machines in either a parallel or serial manner, depending upon the form of the signals representing numerical data. Signals carried in a single channel or wire to represent the digits of a number is termed "Serial Operation." However, the use of a separate channel or wire for each digit-representing signal comprising a numerical value is parallel operation. Generally, the present invention relates to a parallel system for performing binary addition.

In summing a pair of numbers repersented by electrical signals, corresponding orders or digits are normally considered in sequence. When the sum of the digits in an order is equal to, or greater than, the radix of the system in use, the sum digit of the next-higher-order is increased by one. In this manner, a one-digit is carried into the next higher order and is therefore generally referred to as a carry-digit.

In the normal operation of summing numbers, it is necessary to determine the presence of a carry-digit in each order prior to completing the addition of the digits in that order. Therefore, adder systems have normally operated sequentially on the orders of a numerical value. As a result, the operation speed for an adder system has been severely limited.

In general, the present invention comprises a system for summing numerical values which are represented by digital signals. The system includes apparatus to accelerate the movement of carry signals so as to reduce the operation time required to complete an addition. Furthermore, an improved means is provided for interconnecting component adder circuits, to further reduce the operating time of the system.

The objects and advantages of the present invention will become readily apparent from a consideration of the following description taken in conjunction with the figures herein:

In general, parallel binary adders include a plurality of interconnected component adder circuits, one for each order of the numbers to be combined. Various forms of component-adder circuits, and methods of interconnecting these circuits are shown and described in a book entitled, "Arithmetic Operations in Digital Computers," by R. K. Richards, published in 1955 by D. Van Nostrand Company, Inc.

Figure 1:
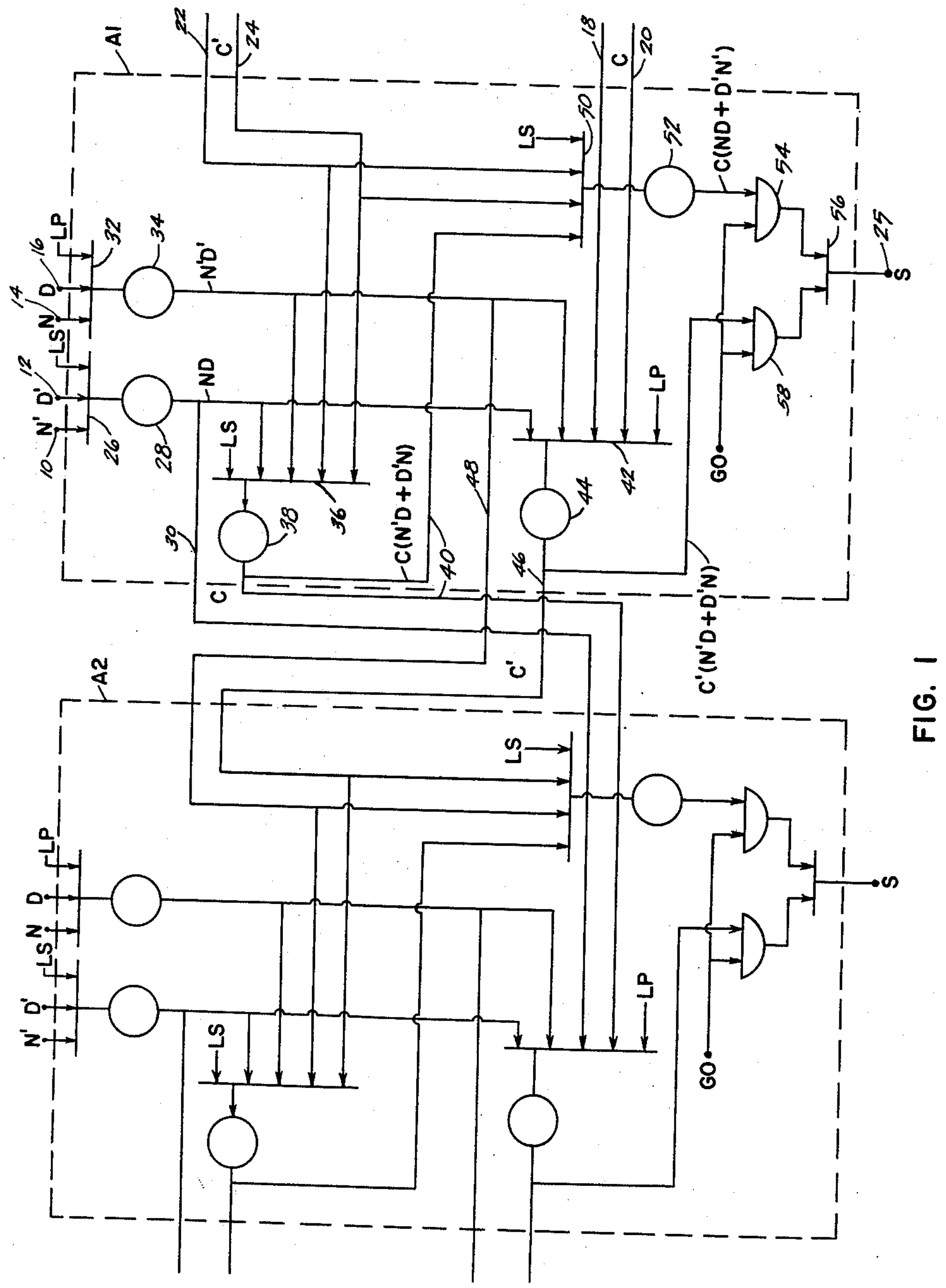
FIGURE 1 is a diagrammatic representation of component adder circuits which are employed in the illustrative embodiment of the present invention.

Referring to FIGURE 1, adder circuits A1 and A2 are shown, which circuits are interconnected according to the principles of the present invention to summarize the digits in two orders of a pair of binary numbers. The circuits A1 and A2 are similar and employ three logic elements: an inverter circuit, represented by a circle; an "or" gate represented by a straight line receiving a plurality of arrows; and an "and" gate, represented by a semi-circle receiving a plurality of arrows. These logic elements are employed in conjunction with two-state electrical signals, which represent numerical values, to perform summarizing operations. The two-state signals are always either in a high state or a low state. In accordance with accepted convention, the high-state of an electrical signal indicates the existence of the signal while the low-state of the signal indicates the absence of the signal.

The function of an inverter circuit, as employed in the illustrative embodiment, is to alter the state of a two-state signal. In the present system, "or" gates function to pass the high state of any received signals, without interconnecting the source of signals applied to the "or" gate. The "and" gates provide a high output signall only if all the input signals are in a high state. Exemplary forms of these circuits are shown and described in U.S. Patent 2,769,971, issued November 6, 1956, to C. J. Bashe.

In view of the similarity of the adder circuits A1 and A2, only the circuit A1 and the interconnections between the two circuits will be considered in detail.

Input signals, representative of one order of a numerical value, are applied to the adder circuit A1 through terminals 10, 12, 14 and 16. The terminal 14 receives a two state signal system indicative of one binary digit in the augend, and the terminal 10 receives the inverse of the signal applied at the terminal 14. That is, the terminal 14 receives a signal N, which manifests a one-digit when high and a zero-digit when low. Conversely, terminal 10 receives a signal N' which is low when the applied order of the augend is a one-digit and high when a zero-digit is presented.

The terminals 16 and 12 receive the signals D and D', respectively, which are representative of one digit in the addend.

The adder circuit A1 also receives signals on conductors 18, 20, 22 and 24 from the previous component adder circuit. The conductors 18 and 20 jointly carry a signal C, representative of a carry digit from the lower stage. Similarly, the conductors 22 and 24 carry a signal C' representative of a no-carry digit or the inverse of the signal C. The signals C and C' may be formed by connecting the conductors 18 and 20 or the conductors 22 and 24 to an "or" gate; however, this operation is performed within the adder circuit A1 by a single gate which also operates upon other signals.

The sum of the input digits to the adder circuit A1 is manifest by a signal S which is developed at a terminal 25 from the adder circuit. The manner in which the adder circuit functions to develop the signal S from the applied input signals will now be considered in detail. However, this description and the equations provided assume a knowledge of Boolean algebra. A detailed consideration of Boolean algebra is set forth in the above-referenced book, Arithmetic Operations in Digital Computers.

In considering the development of the signal S representing the sum of the digits applied to the adder A1, the signals LS and LP will be ignored. These signals when high cause the adder A1 to form an output signal S representative of the logical product or the logical sum of the digits represented to the adder by the signals N and D. The operation of the system at a time when these signals are high will be considered hereinafter.

The terminals 10 and 12 are connected through an "or" gate 26 to an inverter 28. Therefore, the output from the inverter 28 is the inverted logical sum of the signals applied at the terminals 10 and 12, and may be represented by the following equation: $(N'+D')'=ND$.

As indicated in the above equation, the inverted form of the logical sum of the signals N′ and D′ is equal to the logical product of the signals N and D. This combined signal ND is carried in conductor 30 and comprises a part of the carry signal.

The terminals 14 and 16, carrying electrical signals N and D are connected by "or" gate 32 to an inverter 34. Therefore, the output of the inverter 34 is the inverse of the logical sum of the signals N and D, as indicated in the following equation:

$$(N+D)'=N'D'$$

The signals ND and N′D′ are both applied to an "or" gate 36, the output of which is applied to an inverter 38. The "or" gate 36 also receives signals through conductors 22 and 24 which jointly represent the not-carry signal C′. Therefore, the output from the inverter 38 is the inverted logical sum of the signals ND, N′D′ and C′. The combination of these signals may be represented in equation form as follows:

$$\begin{aligned}&((ND)+(N'D')+C')'\\&=(ND)'(N'D')'(C)\\&=(N'+D')(N+D)(C)\\&=(N'N+N'D+D'N+D'D)(C)\\&=(N'D+ND')(C)\end{aligned}$$

The signal represented by the equations set out above is carried in the conductor 40, manifesting the output from the inverter 38. The conductors 30 and 40 may thus be seen to jointly carry the carry signal C from the adder A1. That is, the logical sum of the signals in the conductors 30 and 40 is:

$$(N'D+ND')(C)+ND=\text{carry}$$

The above equation may be seen to truly represent the carry signal by considering that a carry is provided from the adder circuit A1 if either: (1) both the input signals N and D are high and represent a one digit; or (2) if a carry is received from the previous component adder circuit and either the N or the D signal is exclusively high to represent a one digit.

As indicated above in detail, the carry signals C from each of the adder stages as the stage A1 are applied to the following stage which receives digits of the next-higher order of the values to be combined. In accordance with one aspect of the present invention, the not-carry signals C′ are also applied from each stage in the adder system to next stage, e.g. from the adder circuit A1 to the adder circuit A2. The manner in which the not-carry signal C′ is developed will now be considered in detail.

As shown in FIGURE 1, the output signals from the inverters 28 and 34 are connected to an "or" gate 42, the output of which is applied to an inverter 44. The "or" gate also receives signals through conductors 18 and 20 representative of the carry signal C. Therefore, the output of the inverter 44 is the inverted logical sum of the signals ND, N′D′ and C. This logical combination may be stated in equation form as follows:

$$\begin{aligned}&((ND)+(N'D')+C)'\\&=(ND)'(N'D')'(C')\\&=(N'+D')(N+D)(C')\\&=(N'N+N'D+D'N+D'D)(C')\\&=(N'D+D'N)(C')\end{aligned}$$

The last of the above equations (in simplified form) which appears in conductor 46 (output from the inverter 44) may be seen to represent the not-carry signal C′ when logically summed with the output from the inverter 34 as carried in the conductor 48. The logical sum of these two signals may be expressed as:

$$(N'D+D'N)(C')+N'D'=\text{not carry}$$

Considering the above equation, it may be seen that the conditions for no carry are truly expressed as the occurrence of neither of the signals N or D representing a one digit, or the occurrence of a no-carry signal and a zero digit for one of the inputs expressed by the signals N′ or D′.

The manner in which the component adder circuit A1 functions to combine the signals N and D representative respectively of the digits in one order of the augend and addend, whereby to form a sum signal S representative of the sum digit for that order, will now be considered.

The output from the inverter 38, appearing in conductor 40 is applied to an "or" gate 50 (lower right). The "or" gate 50 also receives the not-carry signal C′ through conductors 22 and 24. The output of this gate 50 is applied through an inverter 52 to an "and" gate 54, which also receives a signal GO that serves to control the operation of the adder circuit A1.

The output from the "and" gate 54 is applied to an "or" gate 56 along with the output from an "and" gate circuit 58. The "and" gate 58 is connected to receive the signal GO and the signal in the conductor 46 from the inverter 44.

The gate 50 and the inverter 52 function to form a signal representative of the inverted form of the logical summation of the not-carry signal C′ and the signal from the inverter 38. The output from the inverter 52 may be represented in equation form as follows:

$$\begin{aligned}&(C(N'D+D'N)+C')'\\&=C(N'D+D'N)'\\&=C((N'D)'(D'N)')\\&=C((N+D')(D+N'))\\&=C(ND+NN'+D'D+D'N')\\&=C(ND+D'N')\end{aligned}$$

The last of the above equations may be seen to express the conditions which will result in a sum digit from the circuit A1 when this circuit receives a carry signal C. That is, in the event that a carry signal C is received, a high value for the signal S (indicating a one digit) occurs either if: (1) both the signals N and D are high (representing one digits) or (2) both the signals N′ and D′ are high (representing zero digits).

The development of a high signal S at a time when a no-carry signal C′ is received by the adder circuit A1 is performed by the gate circuit 58 and the inverter 44. That is, the signal in the conductor 46, representative of:

$$C'(N'D+D'N)$$

states the conditions for a one value as the sum at a time when a one digit is not carried into the adder circuit A1. Considering the above equation, the absence of a carried one digit results in the production of a high value of the sum signal S when either one of the signals N or D is high along with a high value of the other of the signals N′ and D′.

Reviewing the operation of the adder circuit A1, it may be seen that the circuit functions to provide a sum digit S representative of either a zero-digit or a one-digit representative of the digit in the order in which the circuit is employed. Furthermore, the circuit functions to produce signals C and C′, representative of the carry and not carry from the stage or order in which the circuit is employed.

The connections between the adder circuit A1 and the adder circuit A2 may be seen to be carried by the conductors 30, 40, 46 and 48. The operation of the adder circuit A2 is precisely similar to the operation of the adder circuit A1. Of course, the number of adder circuits employed in a particular adder system will depend upon the number of orders in the numerical values to be arithmetically combined. Groups of interconnected adder circuits as those described above will be considered hereinafter; however, first a consideration of the adder circuit to provide logical sums and logical products is provided.

In some instances it is desirable to form the logical sum or the logical product of two groups of binary digits. In performing these operations, no carries are passed between the stages or orders of the groups of digits. That is, the logical sum of each order is a one digit if a one digit is present in either of the augend or added.

The logical product of a pair of binary digits is a one digit only if both the augend and the addend are one digits. Otherwise, the logical product is a zero digit.

Referring now to FIGURE 1, the logical sum of the digits (represented by the signals N and D and the inverse of these signals, i.e. signals N′ and D′) is provided at the terminal 25 when the signal LS is in a high state.

The occurrence of the signal LS in a high state results in the output from the inverters 28 and 38 being low. Therefore, the carry signal C from each state is held at a low value to indicate the absence of a one-digit carry. As a result of the carry signal C being low, the only variable input to the "or" gate 42 is the signal N′D′. Passing the signal through the inverter 44 changes its form to (N′D′)′. The logical representation of the signal may be changed to $N+D$, which is of course, the logical sum of the signals N and D.

The signal representing $N+D$ is applied through the gate 58 and the gate 56 to the output terminal 25.

It is to be noted, that the not-carry signals C′ from the previous stage are nullified during the logical sum operation by the application of the signal LS to the gate 50, thereby assuring that the output from the inverter 52 is in a low state.

The occurrence of the signal LP in a high state results in the production of the logical product at the terminal 25. In detail, the high value of the signal LP reduces the output from the inverters 34 and 44 to a low state. The result is that the not-carry signal is nullified. Therefore, only the signal representing the logical expression ND is applied to the "or" gate 36. Therefore, the output from the inverter 38 may be expressed as (ND)′. This expression is better stated in the form $(N'+D')$. Application of the signal representing the latter logical expression to the gate 50 and the inverter 52 changes the form to $(N'+D')'$ which may be stated ND, comprising the desired logical product. The signal representing this product passes through the gates 54 and 56 to appear at the terminal 25.

Figure 2:
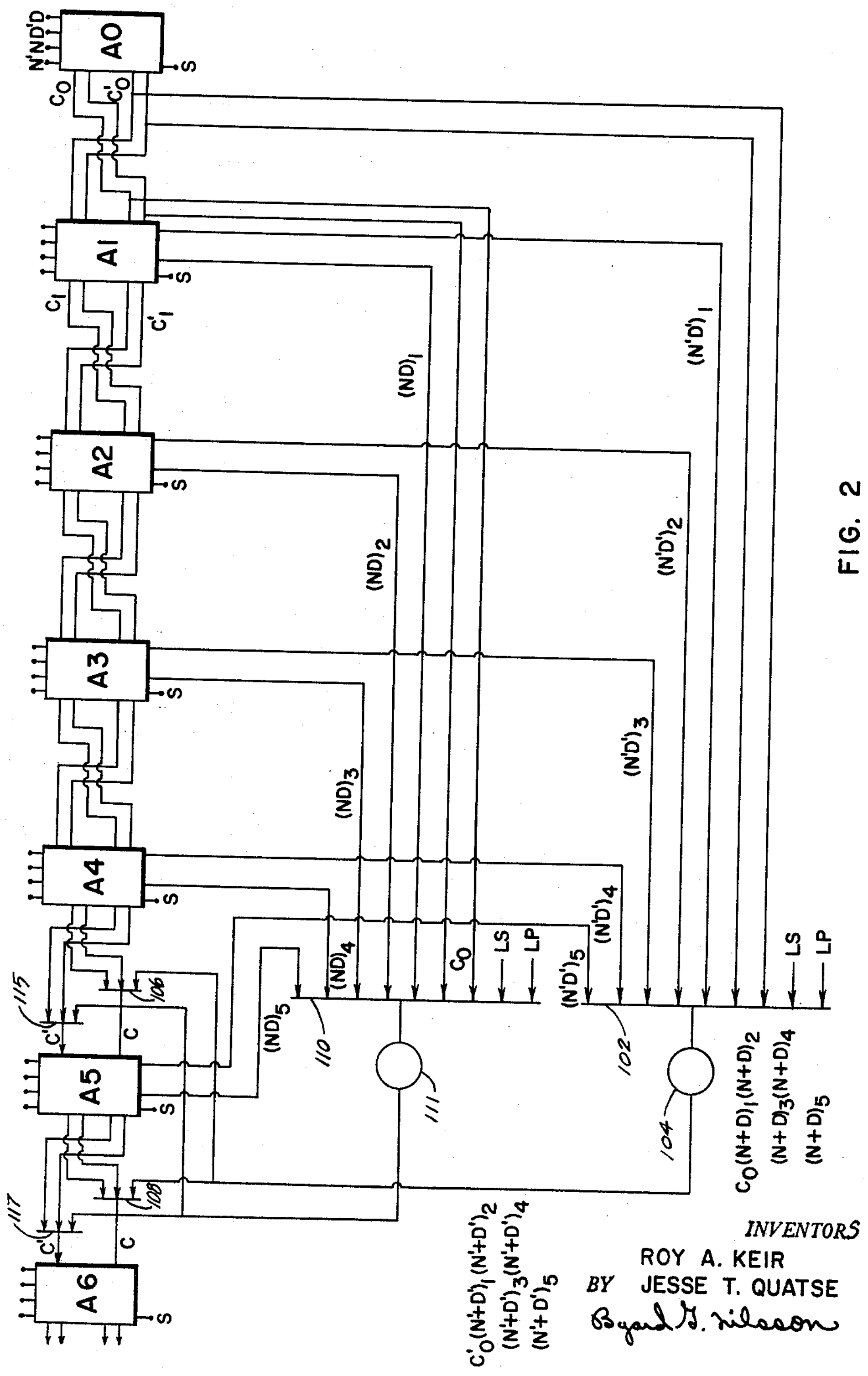
FIGURE 2 is a diagrammatic representation of a system constructed in accordance with the present invention and including several component adder circuits.

In view of the above consideration of component adder circuits, it is apparent that a series of such circuits, e.g. adder circuits A1 and A2, may be interconnected to form a parallel digital adder. Reference will now be had to FIGURE 2 for a consideration of one manner in which the individual component adder circuits may be interconnected to form a composite adder system.

FIGURE 2 shows component adder circuits A0 through A6 which are interconnected to form a complete adder system. It is apparent, from a consideration of FIGURE 2 that the adder A6 cannot operate until it is provided with a signal or signals indicative of the carry information. Therefore, in the normal operation of a parallel adder, the individual circuits must operate in a sequential manner from the least-significant order to the most-significant order. Of course, this mode of operation is time consuming; therefore the present invention incorporates means for more rapidly manifesting the carry-digit information.

In the system of FIGURE 2, each of the adder circuits A1 through A6 simultaneously receive input signals. Therefore, carry digits resulting from each adder could be provided simultaneously if the carry-signals were provided. In accordance with the present invention, leap circuits are provided between certain of the adder circuits to by-pass the carry signal information whereby to reduce the operating interval of the entire system. Considering FIGURE 2 in greater detail, an "or" circuit 102 is connected to receive the not-carry signal from the adder A0 and the signal N′D′ from each of the adder circuits A1 through A5. The gate circuit 102 is also connected to receive the signals LS and LP. The output from the gate circuit 102 is connected through an inverter 104 to the carry inputs of adder circuits A5 and A6. The connection of the inverter 104 to the adder circuit A5 is through an "or" gate 106, and the similar output to the adder A6 is through an "or" gate 108.

Considering the logical significance of the signal from the inverter 104, it is to be noted that the output from this inverter represents the inverted summation of the input signals to the circuit 102. This summarized and inverted signal may be seen to be represented by the following equations:

$$(C'_0+(N'D')_1+(N'D')_2+(N'D')_3+(N'D')_4+N'D')_5)' \\ =C_0(N+D)_1(N+D)_2(N+D)_3(N+D)_4(N+D)_5$$

The latter of the above equations indicates the conditions which will produce a carry signal to the adder circuit A6 which is generated in the adder circuit A0. That is, the symbol $C_0$ indicates a carry from the adder circuit A0 and the presence of either of the signals N or D of each of the following stages results in the propagation of the carry through that stage. Therefore, the appearance of a high signal from the inverter 104 indicates that a one digit is to be applied to the adder A6 as a carry digit. However, the occurrence of a low signal from the inverter 104 does not necessarily mean that no one digit is to be applied to the adder circuit A6 as a carry digit. For example, a carry digit may be generated in one of the intermediate stages and propagated onto the adder circuit A6. To provide information to indicate that no one digit is applied to the adder A6, an "or" gate 110 and an inverter 111 are connected to the adder stages A1 through A6. The gate 110 is connected to receive the carry signal $C_0$ from the adder stage A0, and the signal ND from each of the stages A1 through A5. The logical summation of these terms by the gate 110 and the inversion thereof by the inverter 111 produces a signal representative of the following equation:

$$C'_0(N'+D')_1(N'+D')_2(N'+D')_3(N'+D')_4(N'+D')_5$$

This equation indicates the conditions for the occasion of a zero-digit carry being applied to the adder circuit A6. That is, no carry is applied to adder A6 if no carry existed from the adder circuit A0 (resulting in a high value for the signal $C'_0$) and either a signal N′ or D′ is present from each of the adder circuits A1 through A5. These conditions produce a high value of the signal from the inverter 111 which is applied as a not-carry signal C′ to the adders A5 and A6 through "or" gates 115 and 117.

Considering the system of FIGURE 2, it may be seen that the carry signal information from A0 is applied through the inverters 111 and 104, comprising a leap circuit 114 to arrive at the adder circuit A6 much earlier than the similar signals passing through each of the adder circuits.

Of course, to obtain the ultimate in speed, leap circuits would be connected to interlink almost every stage in the entire system; however, such an arrangement would be very expensive. Therefore, the present invention proposes the discriminate use of leap circuits in accordance with a predetermined basis of selection, to obtain a desirable compromise between system-complexity and speed as explained hereinafter.

It is to be noted that the signals from the inverters 104 and 111 are applied to both adder circuits A5 and A6.

The reason for this dual connection is considered hereinafter with reference to FIGURE 4.

Figure 3:
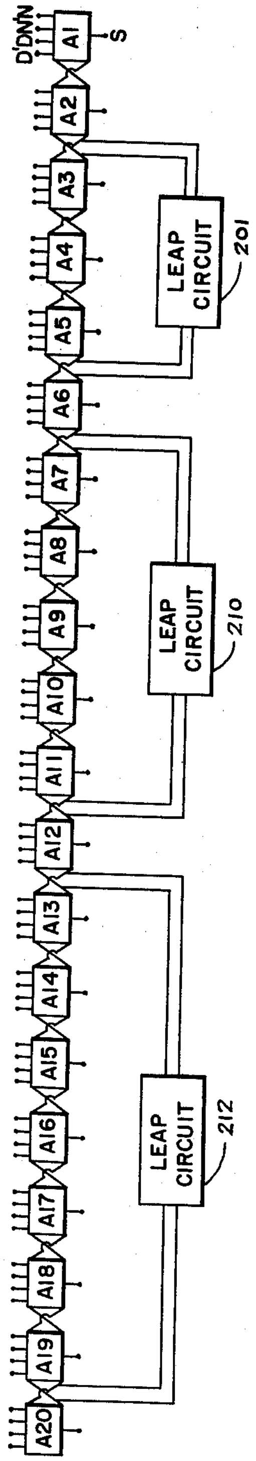
FIGURE 3 is a diagrammatic representation of another system constructed in accordance with the present invention.

In the system of FIGURE 3 adder circuits A1 through A21 are interconnected, as shown in FIGURE 1, to form a composite adder system. Leap circuits, as shown in FIGURE 2, are provided between adder circuits: A2 and A6; A6 and A12; and A12 and A20. In order to leave the drawing legible, the connections to the intermediate adder circuits are not shown, rather only two cables carrying the carry-signal information are indicated. A leap circuit 201 is connected between adder circuits A2 and A6, while leap circuits 210 and 212 are connected respectively between adder circuits A6—A12 and A12—A20.

Considering the operation of the adder circuits A1 through A5 in conjunction with the leap circuit 201, it may be seen that regardless of where carry digits are generated, the adder circuit A6 will be informed of the presence of a carry digit after the interval required for a signal to pass through three inverter stages. That is, as previously indicated, assuming the existence of one inverter circuit in the carry-digit path through each of circuits A1 through A5, the carry-information will be manifest at the adder circuit A6 after the inverval required for a signal to clear three of the adder circuits. For example, assume that a one-digit or zero-digit carry signal is generated in the adder circuit A1 and is propagated to the adder circuit A6. Note that a one-digit carry coincides to a high value of a carry signal C, while a zero-digit carry is a high value of a not-carry signal C′. The carry signal passes through inverters in the adder circuits A1 and A2, and the inverter in the leap circuit 201, to reach the adder circuit A6. Therefore, the carry signals are passed through only three inverter circuits, i.e. one in the adder circuit A1, one in the adder circuit A2 and one in the leap circuit 201, and experiences three inverter-response delay intervals.

In the event that the adder circuit A3 generates a carry signal which propagates to the adder circuit A6, an interval is again required which will allow the carry signal to pass through three inverters, i.e. the inverters in each of the adder circuits A3, A4 and A5. Consideration of various possibilities will indicate that a time interval, adequate to allow a signal to pass through three inverter circuits, will invariably permit the carry signal to appear at the input to the adder circuit A6. It may therefore be seen, that five adder stages are operated in a time interval which would normally accommodate only three inverter-containing adder stages.

In operating the complete adder system, separate signals GO (FIGURE 1) may be applied to the adder circuits to properly sequence their operation according to the arrival of carry (and not-carry) signals or the GO signals may be applied simultaneously as provided herein. In that case, the output sum signals will be accepted after a predetermined delay period. For example, the signals from the first five stages of FIG. 3 are acceptable after the interval required for a signal to clear three stages.

In view of the time required for the adders A1 through A6 to operate, the next leap circuit 210 (FIGURE 3) extends over five circuits including adder circuits A7 through A11. The number of adder stages which are leaped is two more than the previous leap, because three inverter-clear intervals assure that all carry signals have reached adder A6, and two more intervals allow the signals to clear the adder circuit A6 and the leap circuit 210. Therefore five intervals are involved, and five adder circuits, A7 through A11 can be leaped.

For the same reason, the next leap circuit 212 passes over seven adder circuits A13 through A19. Thus the adder circuits are leaped in progressively-increasing numbers according to a progression which adds two to each number in the progression. In the adder system of FIGURE 3, as the number of adder circuits increases, long sequences of circuits are created in which carry signals may be generated but not passed through. For example, consider that a carry (or not carry) signal is generated in the adder circuit A10 but is propagated only as far as A18. As no leap circuits exist between the circuits in this sequence, an extended time interval must be provided. To avoid this situation, it is desirable to provide leap circuits for the adder system in a symmetrical fashion.

Figure 4:
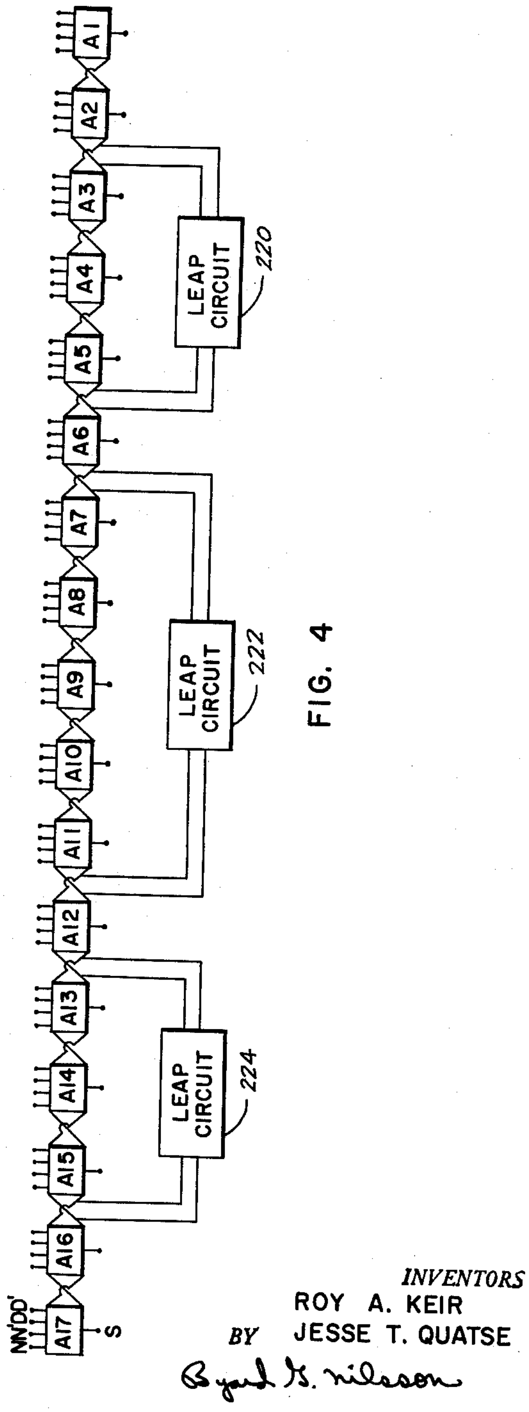
FIGURE 4 is a diagrammatic representation of still another system constructed in accordance with the present invention.

Considering FIGURE 4, there are shown a plurality of adder circuits A1 through A17 which are interconnected as previously described with respect to FIGURE 1 and also by leap circuits 220, 222, and 224. The leap circuit 220 applies the carry signals from the adder circuit A2 to the adder circuit A6. The leap circuit 222 is connected between the adder circuit A6 and the adder circuit A12; and the leap circuit 224 is connected from the adder circuit A12 to the adder circuit A16. This symmetrical arrangement provides an optimum arrangement in which the time interval is minimized for the number of leap circuits provided. That is, the leap circuits skip a progressively increasing and decreasing number of adder circuits to form a symmetrical system.

In certain instances, it is desirable to increase the speed of an adder system over that of systems as shown in FIGURE 4. One manner of accomplishing such an increase is to provide leap circuits within leap circuits. For example, considering the adder circuits A3, A4 and A5 of FIGURE 4, a carry signal generated in adder circuit A3 and propagated through the adder circuit A5 passes through three inverter circuits. As previously explained, the adder circuits A1 through A5 including the leap circuit 220 operated in an interval to accommodate three adder stages, each containing a unit of delay. Therefore, a configuration similar to that including adder circuits A1 through A5 and leap circuit 220 may be employed to replace the adder circuits A3, A4, and A5 in the system of FIGURE 4 to thereby increase the number of orders in the adder without increasing the operating time.

The reason for the cross connection illustrated in FIGURE 2 will now be considered. In FIGURE 4, it is possible that a zero-digit (manifest by the carry signal C being low) is applied to the carry line from the adder A6 indicating no one-digit carry. However, as previously considered, this signal does not cover the possibility of a one-digit carry signal being developed in an intermediate adder circuit, e.g. adder A3, resulting in a one-digit carry which is applied to adder circuit A6. As previously described, this possibility is covered by the carry signal C′, which if high, assures that no one digit is carried to adder circuit A6.

Referring to FIGURE 1, it is again noted that the two carry signals C and C′ are independently formed in each adder. Therefore, in an instance when the leap signal C is low, and the leap signal C′ is high (applied to adder A6) the adder A6 does not receive positive carry information until receiving the high value of the carry signal C′. Consider now the form of the leap signal C′ applied to the adder A6:

$$C'_0(N'+D')_1(N'+D')_2(N'+D')_3(N'+D')_4(N'+D')_5$$

If the term $(N'+D')_5$ is low the input to adder A5 from the leap circuit is ineffective; however, in that instance, no information is provided adder A5 by the leap carry signal C′. However, if the signal $(N'+D')_5$ is high, then the advance carry information is provided adder A5. In this instance, if the other terms in the above expression are high, the carry signal C from the adder A5 is driven low, to provide this signal consistent with the high carry signal C′ from the adder A5.

Figure 5:
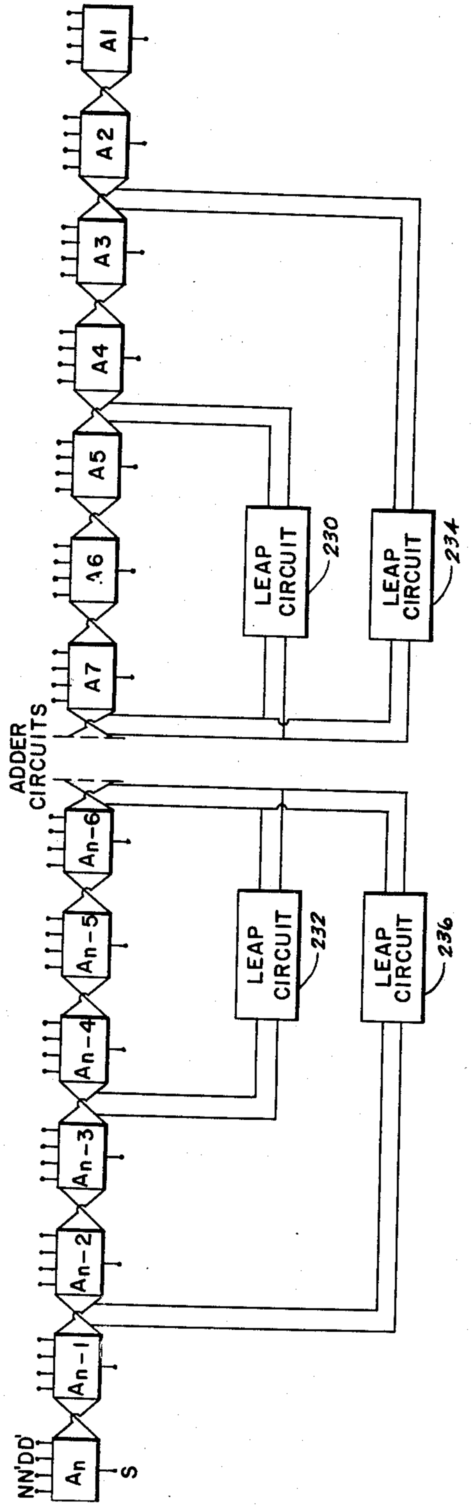
FIGURE 5 is a diagrammatic representation of a still further system constructed in accordance with the present invention.

An arrangement incorporating this principle is shown in FIGURE 5 wherein leap circuits 230 and 232 are connected within leap circuits 234 and 236. The system of FIGURE 5 is symmetrical and the number of adder circuits leaped varies in accordance with an ascending and descending numerical sequence to reduce the number of adder circuits which appear in a sequence through which the carry information must travel. Of course, the information will continue to travel through the adder circuits; however, the operation time of the system can be reduced to just accommodate signals passing through the faster (or shorter) carry paths. For example, referring to FIGURE 5, the adder circuits A1 through A7 deliver all the carry-signal information to the next adder stage after three units of delay (interval adequate for the information to clear three adder circuits, e.g., pass through the inverter circuits in adder circuits A1, A2, and leap circuit 234). Consideration of various other possible routes of the carry signal information will indicate a similar maximum time interval.

It may therefore be seen, that the present invention provides an adder system for arithmetically combining numerical values represented by digital signals, in a parallel fashion, and wherein an exceedingly fast system may be constructed relatively inexpensively.

Although various features and concepts of the present invention have been set forth in the foregoing illustrative embodiment, the present invention is not to be limited in accordance therewith but is to be constructed in accordance with the claims set forth below.

What is claimed is:

1. A parallel binary digital adder system for summing a pair of numerical values each represented by plural binary input signals ranging in sequence to represent binary digits from most significant to least-significant orders, comprising: a plurality of adder circuits each having first input terminals for respectively receiving a pair of said input binary signals representing digits of one order, and second input terminals for receiving carry signals, each of said adder circuits including means to generate a sum signal representative of the sum of the received binary input signals, and means to generate a carry signal representative of a carry digit from the adder circuit; means connecting said adder circuits in a serial sequence whereby carry signals from each adder circuit are applied to said second input terminals of the next order adder circuit; a first sensing means to form one auxiliary carry signal upon the occurrence of signals applied at the input terminals of a first select group of said adder circuits which result in the propagation of a carry signal through all of said first select group of adder circuits; means for applying said one auxiliary carry signal to the second input terminals of the most-significant order adder circuit in said first select group of adder circuits, a second sensing means to form another auxiliary carry signal upon the occurrence of signals applied at the input terminals of a second select group of said adder circuits which includes said first select group of adder circuits, said second sensing means for propagating a carry signal through all of said second group of adder circuits; and means for applying said other auxiliary carry signal to the second input terminals of the most-significant order adder circuit in said second select group of adder circuits.

2. A parallel binary digital adder system for summing a pair of numerical values each represented by plural binary input signals ranging in sequence to represent binary digits from most significant to least-significant orders, comprising: a plurality of adder circuits each having first input terminals for respectively receiving a pair of said input binary signals representing digits of one order, and second input terminals for receiving carry signals, each of said adder circuits including means to generate a sum signal representative of the sum of the received binary input signals, and means to generate a carry signal representative of a carry digit from the adder circuit; means connecting said adder circuits in a serial sequence whereby carry signals from each adder circuit are applied to said second input terminals of the next order adder circuit; sensing means to form auxiliary carry signals upon the occurrence of signals applied to the input terminals of select, distinct groups of said adder circuits which result in the propagation of a carry signal through all the adder circuits of a group, certain of said adder circuits being common to at least two of said groups; and means for applying the auxiliary carry signals to the second input terminals of the most-significant adder circuit in the group of adder circuits through which a carry signal is indicated to be propagated.

3. A parallel binary digital adder system for summing a pair of numerical values each represented by plural binary input signals ranging in sequence to represent binary digits from most significant to least-significant orders, comprising: a plurality of adder circuits each having first input terminals for respectively receiving a pair of said input binary signals representing digits of one order, and second input terminals for receiving carry signals, each of said adder circuits including means to generate a sum signal representative of the sum of the received binary input signals, and means to generate a carry signal representative of a carry digit from the adder circuit; means connecting said adder circuits in a serial sequence whereby carry signals from each adder circuit are applied to said second input terminals of the next order adder circuit; plural sensing means to form auxiliary carry signals upon the occurrence of signals applied at the input terminals of select groups of said adder circuits which result in the propagation of a carry signal through each select group of adder circuits, certain of said adder circuits being common to at least two of said groups; means for applying said auxiliary carry signals to the second input terminals of the most-significant order adder circuit in each select group of adder circuits; and means for disabling said means for applying said auxiliary carry signal and said means connecting said adder circuits whereby said system produces signals representative of logical combinations of said numerical values.

4. A parallel binary digital adder system for summing a pair of numerical values each represented by plural binary input signals ranging in sequence to represent binary digits from most significant to least-significant orders, comprising: a plurality of adder circuits each having first input terminals for respectively receiving a pair of said input binary signals representing digits of one order, and second input terminals for receiving carry signals, each of said adder circuits including means to generate a sum signal representative of the sum of the received binary input signals, and means to generate a carry signal representative of a carry digit from the adder circuit; means connecting said adder circuits in a serial sequence whereby carry signals from each adder circuit are applied to said second input terminals of the next order adder circuit; at least two first sensing means to form first auxiliary carry signals upon the occurrence of signals applied at the input terminals of select groups of adder circuits which result in the propagation of a carry signal through each of said select groups of adder circuits and at least two second sensing means to form second auxiliary carry signals upon the occurrence of signals applied at the input terminals of the select groups of adder circuits which result in no propagation of a carry signal through each of said select groups of adder circuits, certain of said adder circuits being common to at least two of said groups; and means for applying said auxiliary carry signals to control the operation of the most-significant adder circuit in said select group of adder circuits.

5. A parallel binary digital adder system for summing a pair of numerical values each represented by plural binary input signals ranging in sequence to represent binary digits from most significant to least-significant orders, comprising: a plurality of adder circuits each having first input means for respectively receiving said input binary signals representing digits of one order, and second input means for receiving carry signals, each of said adder circuits including means to generate a sum signal representative of the sum of the received binary input signals, and means to generate a carry signal representative of a carry digit from the adder circuit; means connecting said adder circuits in a serial sequence whereby carry signals from each adder circuit are applied to said second input means of the next order adder circuit; a first sensing means to form a first auxiliary carry signal upon the occurrence of signals applied at the input means of a first select group of said adder circuits to propagate a carry signal through all of said first select group of adder circuits; first coupling means for applying said first auxiliary carry signal to the second input means of the most-significant order adder circuit in said first select group of adder circuits; a second sensing means to form a second auxiliary carry signal upon the occurrence of signals applied at the input means of a second select group of said adder circuits which includes said first select group of adder circuits to propagate a second auxiliary carry signal through all said second select group of adder circuits; and second coupling means for applying said second auxiliary carry signal to said second input means of the most-significant order adder circuit in said second select group of adder circuits.

References Cited in the file of this patent

UNITED STATES PATENTS

| | | |
|---|---|---|
| 2,679,977 | Andrews | June 1, 1954 |
| 2,734,684 | Ross et al. | Feb. 14, 1956 |
| 2,868,455 | Bruce et al. | Jan. 13, 1959 |
| 2,879,001 | Weinberger et al. | Mar. 24, 1959 |
| 2,981,471 | Eachus | Apr. 25, 1961 |

OTHER REFERENCES

Richards: Arithmetic Operations in Digital Computers, D. Van Nostrand and Co., Inc., Princeton, N.J. (March 17, 1955), pp. 91–93, 101.